E. Wilson,
Making Combs,
Nº 5,472.
Patented Mar. 14, 1848.

UNITED STATES PATENT OFFICE.

EBENEZER WILSON, OF REDDING, CONNECTICUT.

MACHINERY FOR DRESSING COMBS.

Specification of Letters Patent No. 5,472, dated March 14, 1848.

*To all whom it may concern:*

Be it known that I, EBENEZER WILSON, of Redding, in the county of Fairfield and State of Connecticut, have invented a new and useful Improvement in Machinery for Cutting Combs and Quilling Their Backs, and that the following is a full, clear, and exact description of the principal or character which distinguishes it from all other things before known and of the manner of making, constructing, and using the same, reference being had to the accompanying drawings, making part of this specification, in which—

Figure 2:
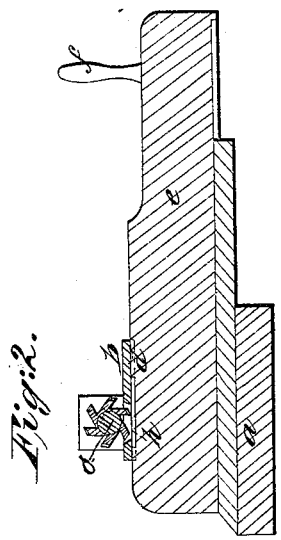
Figure 1:
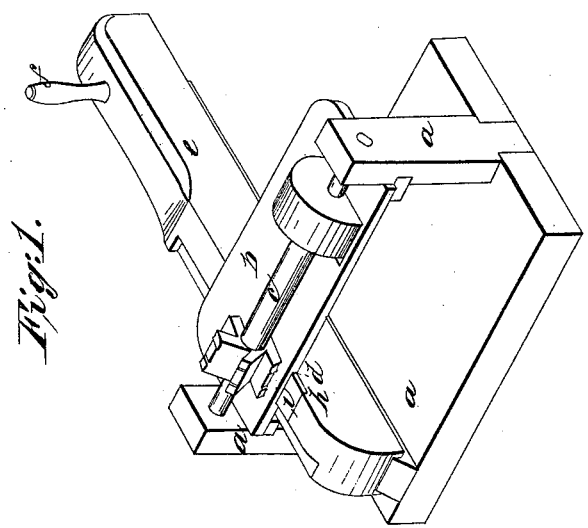

Figure 1 is an isometrical view of the machine, and Fig. 2 represents details of the parts detached.

The same letters indicate like parts in all the figures.

The nature of my improvement consists in the manner of holding and conveying the pieces of horn or other material to the cutters, and so constructing said cutters as to always preserve the same diameter and form of molding during the process of sharpening until the cutters are entirely worn out.

The construction is as follows: On a suitable frame ($a$) a table ($b$) is supported with the standards of the frame projecting above it; just above the table ($b$) a shaft ($c$) is situated having its bearings in said standards; on this shaft there is a cutter head to be hereafter more particularly described, and also a pulley for driving it. The cutter head projects through the table on the under side of which a groove ($d$) is cut, in a line with said cutter head, and into which it projects. A sliding carriage ($e$) is made to move back and forth under the cutter, its open side being guided by the groove ($d$) in which it slides. It is stayed on ways in the frame below to keep it in its place, and may be moved back and forth by hand, a handle ($f$) being shown in the drawing intended for that purpose. In the upper surface of the carriage ($e$) there is a recess ($h$) formed extending from side to side into which the material ($i$) to be cut is placed and by pushing forward the carriage the article ($i$) is carried into the groove ($d$) on the under side of the table and is thus held firmly while the cutter is acting on it, and as soon as it is drawn out it is free and easily removed, and can be replaced by another. This is a matter of great importance in such rapid and cheap operations, while the greatest accuracy is also insured; for while it is under the action of the cutter it is steadily held on all sides although in short pieces.

The cutter is formed of a short cylinder of steel on the face of which is turned any formed molding or pattern suited to the purpose; in this cylinder at proper intervals notches are filed, forming cutters or teeth on the surface and which cutters can be filed up sharp till the cutter wears out, the whole space between one notch and another this will be so obvious on reference, that it needs no further description.

Having thus fully described my improvement what I claim as new and desire to secure by Letters Patent is—

The method of holding the material to the revolving cutter, without clamping, substantially as herein described, by inclosing said material on all sides, by the combination of the recess formed in the carriage and table, through which the rotary cutter head projects in the manner and for the purpose set forth.

EBENEZER WILSON.

Witnesses:
FREDERICK OLMSTEAD,
JARED OLMSTEAD.